United States Patent [19]

Eberhard et al.

[11] Patent Number: 5,713,001
[45] Date of Patent: Jan. 27, 1998

[54] CIRCUIT FOR CONVERTING ADDRESS OPERANDS SUPPLIED BY A PROGRAM TO HASHED VIRTUAL ADDRESS

[75] Inventors: Raymond James Eberhard, Endicott; James Edward Phillips, Binghamton, both of N.Y.

[73] Assignee: International Business Machines Corporation, Armonk, N.Y.

[21] Appl. No.: 521,773

[22] Filed: Aug. 31, 1995

Related U.S. Application Data

[63] Continuation of Ser. No. 926,723, Aug. 7, 1992, abandoned.
[51] Int. Cl.$^6$ ..................................................... G06F 12/10
[52] U.S. Cl. ......................... 395/421.06; 395/421.1; 395/403; 395/415
[58] Field of Search ........................ 395/403, 417, 395/421.06, 420, 421.1

[56] References Cited

U.S. PATENT DOCUMENTS

| | | | |
|---|---|---|---|
| 4,322,815 | 3/1982 | Broughton | 395/775 |
| 4,380,797 | 4/1983 | Desyllas et al. | 395/403 |
| 4,464,713 | 8/1984 | Benhase et al. | 395/415 |
| 4,642,793 | 2/1987 | Meaden | 395/775 |
| 4,680,700 | 7/1987 | Hester et al. | 395/416 |
| 4,991,078 | 2/1991 | Wilhelm et al. | 395/375 |
| 5,233,553 | 8/1993 | Shak et al. | 364/746 |

FOREIGN PATENT DOCUMENTS

| | | |
|---|---|---|
| 108997 | 8/1980 | Japan . |
| 5759252 | 4/1982 | Japan . |
| 5837884 | 3/1983 | Japan . |

OTHER PUBLICATIONS

IBM TDB Vol. 34, No. 12, p. 446, May, 1992, "Wired-In Hash Function For Data Cache Address Calculation", by Kahle et al.

*Primary Examiner*—Eddie P. Chan
*Assistant Examiner*—Reginald G. Bragdon
*Attorney, Agent, or Firm*—Arthur J. Samodovitz

[57] ABSTRACT

A selectable adder/hashing circuit generates a hashed virtual address from address operands within or derived from a program instruction. The hashed virtual address is used to address a translation lookaside buffer (TLB). The hashing function and addition function each comprise multiple steps. Some of the hashing function steps are performed in parallel with some of the steps of the addition function, and other of the hashing function steps are performed within other of the addition function steps. Therefore, the hashing function does not add delay over that required to produce an un-hashed virtual address from an addition function performed on the address operands. The hashing function can be enabled or disabled to meet the needs of the particular program environment. A method for generating the un-hashed address from the hashed address determines if the contents of the TLB location addressed by the hashed address match the unhashed virtual address. If so, the real address corresponding to the unhashed virtual address can be obtained from the TLB without requiring a time consuming address translation.

22 Claims, 13 Drawing Sheets

STAGE 3:

$HN_i = \overline{H_i}$
$46 \leq i \leq 53, i = 58, 59$     "2-1"

$P_1^{i+1} = \overline{PN_i(TN_i + PN_{i+1})}$     $31 \leq i \leq 60$
"2-1"

$T_1^{i+1} = \overline{TN_i + TN_{i+1}}$     $31 \leq i \leq 60$
"2-1"

$cB1_{61} = \overline{PN_{61}(TN_{61} + cN1_{61})}$
"2-1"

$cB1_{62} = \overline{cN1_{62}}$
"2-1"

$HP_1^{i+1} = \overline{HPN_i(HTN_i + PN_{i+1})}$     $i = 31, 32$
"P"

$HT_1^{i+1} = \overline{HTN_i + TN_{i+1}}$     $i = 31, 32$
"P"

$HHN_i = \overline{HASH\ H_i}$     $i = 30, 31$
"P"

STAGE 4:

$PN_1^{i+3} = \overline{P_1^{i+1} + T_1^{i+1} P_{1+2}^{i+3}}$     $31 \leq i \leq 58$
"2-1"

$TN_1^{i+3} = \overline{T_1^{i+1} T_{1+2}^{i+3}}$     $31 \leq i \leq 58$
"2-1"

$cN2_i = \overline{P_1^{i+1} + T_1^{i+1} cB1_{i+2}}$     $i = 59, 60$
"2-1"

$cN2_i = \overline{cB1_i}$     $i = 61, 62$
"2-1"

$S_i = H_i \forall cB1_{i+1}$      $i = 60, 61$
"2-1"

$HPN_1^{i+3} = \overline{HP_1^{i+1} + HT_1^{i+1} P_{1+2}^{i+3}}$     $i = 31, 32$
"P"

$HTN_1^{i+3} = \overline{HT_1^{i+1} T_{1+2}^{i+3}}$     $i = 31, 32$
"P"

$HHXHN_i = HHN_{i-16} \forall H_i$     $i = 46, 47$
"P"

STAGE 5

FIG. 6(b)

STAGE 5:

$$P_i^{i+7} = \overline{P_i^{i+3} + TN_i^{i+3} PN_{i+4}^{i+7}} \qquad 31 \leq i \leq 54$$
"2-1"

$$T_i^{i+7} = \overline{TN_i^{i+3} TN_{i+4}^{i+7}} \qquad 31 \leq i \leq 54$$
"2-1"

$$cB2_i = \overline{PN_i^{i+3} + TN_i^{i+3} cB2_{i+4}} \qquad 55 \leq i \leq 58$$
"2-1"

$$cB2_i = \overline{cN2_i} \qquad 59 \leq i \leq 62$$
"2-1"

$$S_i = HN_i \forall cN2_{i+1} \qquad i = 58, 59$$
"2-1"

$$HP_i^{i+7} = \overline{HPN_i^{i+3} (HTN_i^{i+3} PN_{i+4}^{i+7}} \qquad i = 31, 32$$
"P"

$$HT_i^{i+7} = \overline{HTN_i^{i+3} TN_{i+4}^{i+7}} \qquad i = 31, 32$$
"P"

STAGE 6:

$$PN_i^{i+15} = \overline{P_i^{i+7} + T_i^{i+7} P_{i+8}^{i+15}} \qquad 31 \leq i \leq 46$$
"2-1"

$$TN_i^{i+15} = \overline{T_i^{i+7} T_{i+8}^{i+15}} \qquad 31 \leq i \leq 46$$
"2-1"

$$cN3_i = \overline{P_i^{i+7} + T_i^{i+7} cB2_{i+8}} \qquad 47 \leq i \leq 54$$
"2-1"

$$cN3_i = \overline{cB2_i} \qquad 55 \leq i \leq 62$$
"2-1"

$$S_i = H_i \forall cB2_{i+1} \qquad 54 \leq i \leq 57$$
"2-1"

$$HPN_i^{i+15} = \overline{HP_i^{i+7} + HT_i^{i+7} P_{i+8}^{i+15}} \qquad i = 31, 32$$
"P"

$$HTN_i^{i+15} = \overline{HT_i^{i+7} T_{i+8}^{i+15}} \qquad i = 31, 32$$
"P"

STAGE 7
FIG. 6(c)

STAGE 7:

$cB3_i = \overline{PN_1^{i+15} \ (TN_1^{i+15} \ cN3_{i+16})}$   $31 \leq i \leq 46$
"2-1"

$cB3_i = \overline{cN3_i}$   $47 \leq i \leq 62$
"2-1"

$S_i = HN_i \ \forall \ cN3_{i+1}$   $46 \leq i \leq 53$
"2-1"

$HHXHXc_i = HHXHN_i \ \forall \ cN3_{i+1}$   $i = 46, 47$
"P"

$HcB3_i = \overline{HPN_1^{i+15} \ (HTN_1^{i+15} + cN3_{i+16})}$   $i = 31, 32$
"P"

STAGE 8:

$EA_i = HcB3_{i-15} \ \forall \ HHXHXc_i$   $i = 46, 47$
"P"

FIG. 6(d)

STAGE 1:

$CSAS_i = B_i \forall X_i \forall D_i$  $\qquad 30 \leq i \leq 62$
"3-2"

$CSAC_i = B_i X_i + B_i D_i + X_i D_i$  $\qquad 31 \leq i \leq 63$
"3-2"

$S_{63} = B_{63} \forall X_{63} \forall D_{63}$
"3-2"

$HS_i = HASH\ S_i$  $\qquad i = 30, 31$
"P"

STAGE 2:

$H_i = CSAS_i \forall CSAC_{i+1}$  $\qquad 30 \leq i \leq 61$
"2-1"

$PN_i = \overline{CSAS_i\ CSAC_{i+1}}$  $\qquad 31 \leq i \leq 61$
"2-1"

$TN_i = \overline{CSAS_i + CSAC_{i+1}}$  $\qquad 31 \leq i \leq 61$
"2-1"

$cN1_{62} = \overline{CSAS_{62}\ CSAC_{63}}$
"2-1"

$S_{62} = CSAS_{62} \forall CSAC_{63}$
"2-1"

STAGE 3

FIG. 7(a)

STAGE 3:

$HN_i = \overline{H_i}$
$46 \leq i \leq 53, i = 58, 59$     "2-1"

$P_1^{i+1} = \overline{PN_i(TN_i + PN_{i+1})}$     $31 \leq i \leq 60$
"2-1"

$T_1^{i+1} = \overline{TN_i + TN_{i+1}}$     $31 \leq i \leq 60$
"2-1"

$cB1_{61} = \overline{PN_{61}(TN_{61} + cN1_{61})}$
"2-1"

$cB1_{62} = \overline{cN1_{62}}$
"2-1"

STAGE 4:

$PN_1^{i+3} = \overline{P_1^{i+1} + T_1^{i+1} P_{1+2}^{i+3}}$     $31 \leq i \leq 58$
"2-1"

$TN_1^{i+3} = \overline{T_1^{i+1} T_{1+2}^{i+3}}$     $31 \leq i \leq 58$
"2-1"

$cN2_i = \overline{P_1^{i+1} + T_1^{i+1} cB1_{i+2}}$     $i = 59, 60$
"2-1"

$cN2_i = \overline{cB1_i}$     $i = 61, 62$
"2-1"

$S_i = H_i \forall cB1_{i+1}$     $i = 60, 61$
"2-1"

$HSXHN_i = HS_{i-15} \forall HN_i$     $i = 46, 47$
"P"

STAGE 5

FIG. 7(b)

STAGE 5:

$$P_1^{i+7} = \overline{P_1^{i+3} + TN_1^{i+3} \, PN_{1+4}^{i+7}} \qquad 31 \leq i \leq 54$$
"2-1"

$$T_1^{i+7} = \overline{TN_1^{i+3} \, TN_{1+4}^{i+7}} \qquad 31 \leq i \leq 54$$
"2-1"

$$cB2_i = \overline{PN_1^{i+3} \, (TN_1^{i+3} + cB2_{i+4})} \qquad 55 \leq i \leq 58$$
"2-1"

$$cB2_i = \overline{cN2_i} \qquad 59 \leq i \leq 62$$
"2-1"

$$S_i = HN_i \,\forall\, cN2_{i+1} \qquad i = 58, 59$$
"2-1"

STAGE 6:

$$PN_1^{i+15} = \overline{P_1^{i+7} + T_1^{i+7} \, P_{1+8}^{i+15}} \qquad 31 \leq i \leq 46$$
"2-1"

$$TN_1^{i+15} = \overline{T_1^{i+7} \, T_{1+8}^{i+15}} \qquad 31 \leq i \leq 46$$
"2-1"

$$cN3_i = \overline{P_1^{i+7} + T_1^{i+7} \, cB2_{i+8}} \qquad 47 \leq i \leq 54$$
"2-1"

$$cN3_i = \overline{cB2_i} \qquad 55 \leq i \leq 62$$
"2-1"

$$S_i = H_i \,\forall\, cB2_{i+1} \qquad 54 \leq i \leq 57$$
"2-1"

STAGE 7

FIG. 7(c)

STAGE 7:

$$cB3_i = \overline{PN_1^{i+15} \, (TN_1^{i+15} \, cN3_{i+16})} \qquad 31 \leq i \leq 46$$
"2-1"

$$cB3_i = \overline{cN3_i} \qquad 47 \leq i \leq 62$$
"2-1"

$$S_i = HN_i \forall cN3_{i+1} \qquad 46 \leq i \leq 53$$
"2-1"

$$EA_i = HSXHN_i \forall cN3_{i+1} \qquad i = 46, 47$$
"P"

STAGE 8:

$$S_i = H_i \forall cB3_{i+1} \qquad 30 \leq i \leq 45$$
"2-1"

FIG. 7(d)

CIRCUIT FOR CONVERTING ADDRESS OPERANDS SUPPLIED BY A PROGRAM TO HASHED VIRTUAL ADDRESS

The application is a continuation of application Ser. No. 07/926,723, filed Aug. 7, 1992, now abandoned.

BACKGROUND OF THE INVENTION

The invention relates generally to computer systems, and deals more particularly with address addition and hashing hardware for addressing a translation look aside buffer in a cache system.

High performance computer systems employ a cache system to speed access to data by a central processing unit (CPU). A known cache system includes a cache for storing a subset of data read from or destined for main memory, a directory for storing real main memory addresses of the data in the cache, and a translation look aside buffer (TLB) for storing a list of virtual addresses and the corresponding real addresses. The real addresses in the directory are mapped to corresponding data locations in the cache. A program instruction provides address operands along with a command such as read from or write to the address. Then, computer hardware decodes the instruction and generates a virtual address based on the address operands. If the virtual address is stored in the TLB (a "TLB hit"), the TLB provides an instant translation to the corresponding real address. Next, the real address is compared to the contents of the cache directory to determine if the data from the real address resides in the cache. If the data is resident in the cache (a "cache hit"), then the data is read from cache to the CPU. However, if the data is not resident in the cache (a "cache miss"), then the data is read from main memory to cache for access by the CPU, and the real address is loaded into the cache directory at the mapped position. If the virtual address is not resident in the TLB (a "TLB miss"), then a lengthy process of table lookups from memory and appropriate data manipulations are performed to provide the address translation. Then, the TLB is updated with the new virtual address and corresponding real address. This new virtual address and corresponding real address may overwrite a previously stored virtual address and corresponding real address in the TLB. Because of the lengthy address translation and TLB update necessitated by each TLB miss, system performance is slowed by each TLB miss.

The TLB miss ratio increases when a new addition to the TLB overwrites a previous entry that is likely to be needed next by the CPU. This phenomena is called "thrashing". In such a case, the time consuming address translation will likely be repeated for the previous entry and the system performance will be adversely affected. Thus, to maximize system performance, the TLB miss ratio should be minimized and thrashing should be avoided to the extent possible.

Caches are designed using relatively small, fast, and expensive memory elements that are kept as close to the CPU as feasible in order to permit fast cache access. Whenever the cache contains the needed data (a "cache hit"), then the data can be obtained directly from the cache. This is much faster than fetching the data from main memory after a "cache miss" which historically has taken many machine cycles (known as the cache miss penalty). The performance gained by using caches has been attributed to a program's property of "locality". According to this property, the address or "loci" of a program's next memory reference is likely to be near to the loci recently referenced by the program. Therefore, when a program initially requests data, this data and often other data stored in adjacent real locations is fetched from memory and stored in the cache. Thus, the next request is likely to be satisfied by the cache. System performance is also slowed by each cache miss.

The following is a more specific example of a prior art computer system having a 4K Byte page, a 64 byte cache line, and a 128 set TLB and comprising a cache, directory, and a TLB. The program provides 64 bit base, 64 bit index and 12 bit displacement address operands. Computer hardware references a table based on the base and index address operands to determine corresponding 64 bit base and 64 bit index address components. Then, the base and index address components and the displacement address operand are supplied to an adder, and yield a 64 bit virtual address. The virtual address specifies a 52 bit page index (VA(0:51)) or page identifier, and a 12 bit offset (VA(52:63)) within the page. (Bit 0 is the MSB.) The page offset comprises a 6 bit cache block index (VA(52:57)) and a 6 bit byte offset (VA(58:63)) into the cache block. Because of the 4K-byte page, the 12 least significant bits (LSBs) of the virtual address (i.e. the cache block index and the byte offset) are identical to the 12 LSBs of the real address. As a result, the 12 LSBs of the address do not participate in virtual address translation, and the the real address stored in the TLB omits the 12 LSBs. Assuming the TLB has 128 addressable sets of entries, the seven LSBs of the page index VA(45:51)) are used to access a given TLB entry, i.e. determine the row or set in the TLB to store or locate the virtual address and corresponding real address. All virtual addresses having the same VA(45:51) will be stored in the same set in the TLB potentially overwriting another virtual address having identical bits VA(45:51). Because all virtual addresses of a set are known to have identical bits VA(45:51), and the VA(52:63) do not participate in virtual address translation, only VA(0:44) need to be saved in the virtual address portion of the TLB entry for comparing with the virtual address used to access the TLB. This comparison is used to determine whether the virtual address accessing the TLB is held in the TLB thereby allowing a fast determination of the real address. As noted above, the 12 LSBs of the real address are not required to be saved in the TLB since they are identical to the 12 LSBs of the virtual address. Therefore, for a 4 giga-byte (4 G-byte) main store, only the 20 MSBs of the real address are saved in the real address portion of the TLB.

The first step in determining if the virtual address resides in the TLB is to access the TLB at the address specified by the least significant page index bits (VA(45:51)) of the virtual address. Next, the virtual address bits saved in the TLB (VA(0:44) in the above example) are compared to bits (0:44) of the virtual address, computed by the processor as described above. If the bits are equal (a TLB hit), then the corresponding real address is obtained from the TLB and the directory searched to determine if the real address is currently represented in the cache. (Usually, the cache and directory are accessed, using translation invariant bits of the virtual address, in parallel with the access of the TLB followed by a comparison of the real address obtained from the directory with the real address obtained from the TLB to determine whether the data is in the cache. This approach is known as late select). If so, the cache is accessed. If not, the data is read from main memory to the cache and processor and the directory is updated. However, if the virtual address is not currently stored in the TLB, then the time consuming address translation must be performed, and the results stored in the TLB. Then the cache directory will be searched to determine if the data is in the cache or must be read from main memory.

A problem with this prior art system occurs when different virtual addresses have the same least significant page bits VA(45:51), and these different virtual addresses are accessed alternately, multiple times. In such cases, assuming a direct mapped TLB (i.e. a TLB in which each set contains a single entry), each time a new and different virtual address having the same VA(45:51) is accessed, the new virtual address will not exist in the TLB and the address translation must be repeated. Then, the new virtual address and corresponding real address will overwrite the previous virtual address and corresponding real address in the TLB (i.e. thrash). This process may be repeated multiple times in this scenario. Thus, in certain scenarios considerable time is wasted in the repeated address translations.

To solve this problem, prior art systems incorporate a "hashing" technique so that different virtual addresses having the same least significant page bits are stored with their corresponding real addresses in different rows or sets in the TLB.

Hashing is advantageous in the following scenario. Consider a program in which elements i-j from each of two arrays are added together to create a third array having elements i-j. Each of the arrays is allocated (for the system described above) at 512K byte or larger boundaries. (To facilitate the description, the large boundary within which each array is allocated will be referred to as a data space.) In this scenario, a page number or offset into the respective data space for each element i-j of each array is identical. To illustrate the problem, no hashing is used. For simplicity, a direct mapped TLB is used. Assume that the size of each array element is two bytes, and 2048 successive data elements fit into one page. Let the arrays being added be denoted as array A from data space A and array B from data space B, and the array into which the data is being stored be denoted as array C in data space C. First, the program provides a fetch instruction for element i of array A and the instruction includes the requisite address operands. Then, the computer hardware converts the address operands into a virtual address. Assuming this virtual address does not currently reside in the TLB, the virtual address translation mechanism using table lookups is invoked to translate the virtual address and store the virtual address and the translated real address pair in the TLB. Real address bits associated with this cache block are also stored in the directory (assuming the block was not already resident in the cache). Other hardware also fetches the cache block containing element i of array A from memory and stores the cache block in the cache. Then, element i of array A is read into a processor register. (Although not described in this example, some prior art cache systems group together two or more blocks of data into "congruence classes" to allow a larger real addressed cache while maintaining a late select approach for accessing the cache and also to provide alternate entry locations for holding data within a given set. For ease of exposition, a direct mapped cache is used in this example). Next the program provides a fetch instruction for element i of array B, and the hardware converts the address operands into a virtual address. This virtual address will not reside in the TLB because the set of the TLB to store this virtual address is the same set as that which currently stores the virtual/real address pair for element i of array A (both have the same least significant page bits). Therefore, the address translation mechanism is invoked to translate the virtual address for element i of array B and load the virtual/real address pair in the TLB. The virtual/real address pair for element i of array B will overwrite the virtual/real address pair for element i of array A because both have the same least significant page bits. In this example which includes the direct mapped cache, real address bits associated with the block are also stored in the cache directory overwriting the real address for element i of array B. Then, the cache block containing element i of array B is fetched from memory and stored in the cache over-writing the block containing element i of array A. Then, the element i of array B is written into another processor register. Next, the program provides an instruction to add the contents of the two registers and store the result as element i in array C. Consequently, an address translation is performed for element i of array C and the virtual/real address pair are stored in the TLB. This virtual/real address pair will likewise overwrite the virtual/real address pair for element i of array B because the virtual address of element i of array C has the same least significant page bits. Also, the real address bits for array B in the cache directory are now replaced with those for array C. Then, the block containing element i of array C is fetched, modified with the sum of the two registers, and stored in the cache overwriting the block containing element i of array B. Thus, three address translations and three fetches were required. Assuming the next element i+1 for arrays A, B and C are in the same 4K byte page as the previous element i, (or in another 4K byte page which is not resident in cache), the three address translations and three main memory fetches must be performed again for element i+1 of arrays A, B and C, again for element i+2 of arrays A, B and C and so on. In addition, the cache block containing the element i of array C must be stored back to main memory for each iteration.

Such thrashing can be avoided in the foregoing scenario by altering or "hashing" the virtual addresses for each of the data spaces A, B, and C such that the least significant page bits for each of the arrays is different than the least significant page bits of the other two arrays. With such hashing, the virtual addresses and corresponding real addresses for one or more pages of array A, array B, and array C can all be stored in the TLB at the same time. Thus, the repeated address translations and overwritings required in the foregoing scenario which does not utilize hashing, are avoided, and a cache access to any of these pages from arrays A, B or C incurs only the latency associated with accessing the TLB.

A common, prior art technique for hashing the virtual address is to EXCLUSIVE-OR some of the most significant bits of the virtual address with the least significant page bits of the virtual address. The results of the EXCLUSIVE-OR are then used to address the TLB array, i.e. determine in which set or row in the TLB to locate or store the unhashed virtual/real address pair. Thus, using hashing, two virtual addresses which specify the same page within different data spaces will be stored in different locations in the TLB assuming proper data space allocation. However, the unhashed virtual address and corresponding real address are actually stored in the TLB; the hashed virtual address is only used to determine the set or row used to locate or store the unhashed virtual address.

The amount and cost of the hardware/cells required to implement hashing is minimal. However, a major drawback of prior art hashing techniques is that the hashing function is performed in a path which generates the least significant page bits for addressing the TLB. The duration of this path is critical to system performance, and should be minimized.

A second drawback of hashing is that in different scenarios, hashing may increase rather than decrease the TLB miss ratio. For this reason, a selectable hashing function, i.e. one in which the hashing function can be enabled or disabled, is desirable. An installation could then run its typical load of application programs, determine if hashing improves the TLB miss ratio, and if so, enable hashing for its installation. In prior art, a selectable hash would be implemented by inserting a two-to-one multiplexer after the hashing hardware and before the TLB selection hardware. However, this multiplexer adds a stage of delay in accessing the TLB, and therefore adds to the critical path. (This critical path already suffers the delay imposed by the hashing hardware.)

Accordingly, a general object of the present invention is to provide hashing hardware within a computer processor, which hashing hardware does not add delay to the critical path of accessing a TLB.

Another general object of the present invention is to provide a hashing on or off selector for the foregoing hashing hardware which does not add delay to the critical path.

SUMMARY OF THE INVENTION

The invention resides in a cache system that generates a hashed virtual address from address operands in a program instruction and/or address components derived from the address operands. The invention generates the hashed virtual address in the same time required to generate an unhashed virtual address so that system performance is not slowed by the hashing. The hashed virtual address is used to address a translation look aside buffer.

The cache system comprises a cache for storing data from or for a main memory, a cache directory for storing real or other addresses of the data in the cache, and a translation look aside buffer (TLB) for storing the real or other addresses of the data in the cache and corresponding virtual addresses. The system further comprises a multiple stage adder, coupled to receive the one or more address operands or one or more address components based on the address operands, and perform an addition function which participates in yielding a hashed virtual address. A plural stage hashing circuit is coupled to receive at least one intermediary output of the adder, and uses this intermediary output to perform a step of a hashing function and thereby participate in yielding the hashed virtual address. At least one of the stages of the hashing circuit is performed in parallel with one of the stages of the adder. Thus, the hashing circuit does not delay the generation of the address used to address the TLB. To minimize I/O requirements, the hashed virtual address is unhashed with other circuitry for comparison with the contents of the TLB location addressed by the hashed virtual address.

DETAILED DESCRIPTION OF THE PREFERRED EMBODIMENTS

Figure 1:
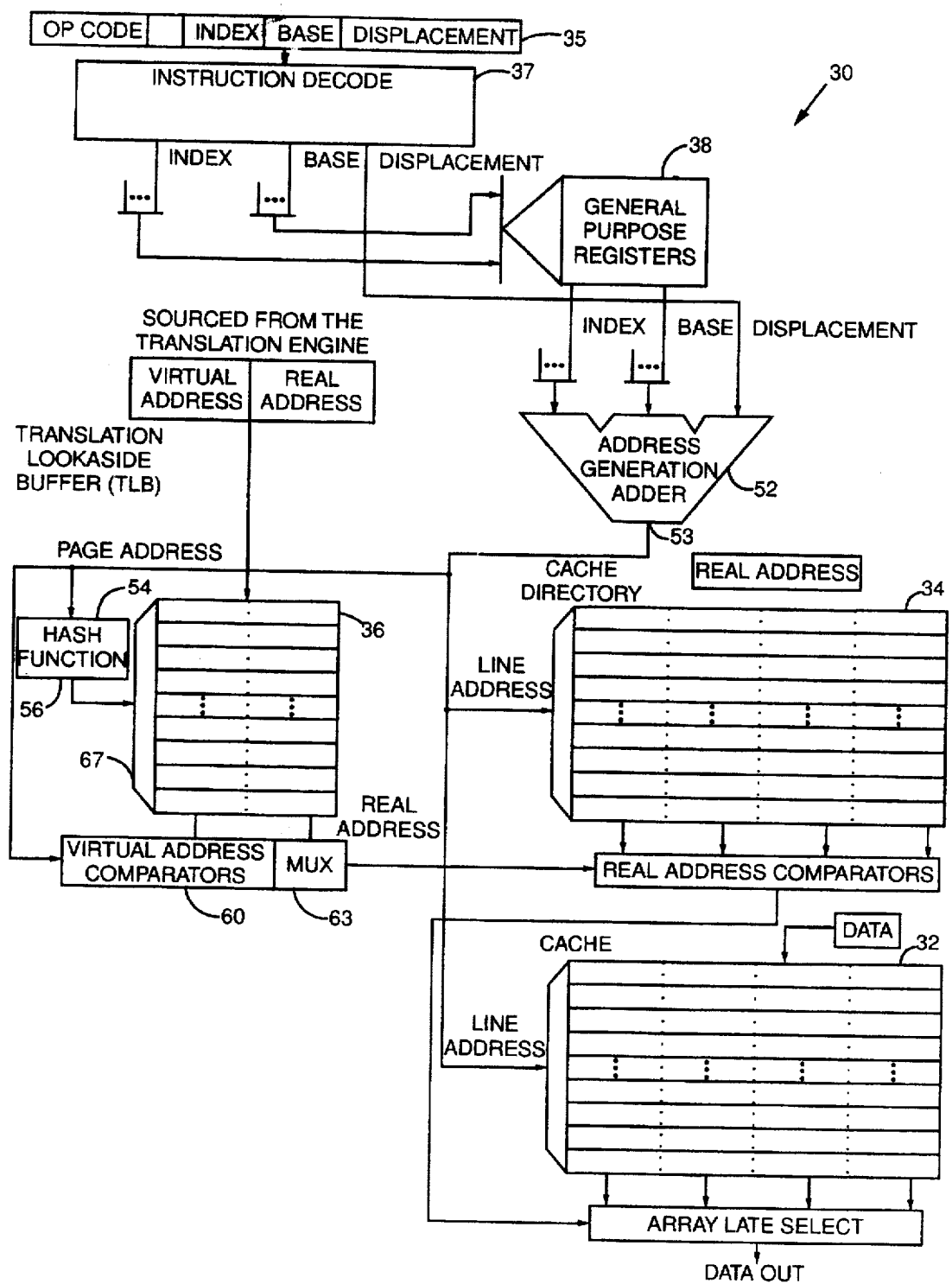
FIG. 1 is a block diagram which illustrates a selectably hashed cache system according to the PRIOR ART.

Referring now to the figures in detail wherein like reference numerals indicate like elements throughout the different figures, FIG. 1 illustrates a selectably hashed cache system generally designated 30 according to the PRIOR ART. Cache system 30 includes a cache 32 for storing data fetched from main memory or written by a CPU, a cache directory 34 for storing real addresses of the data within the cache, and a TLB 36 for storing virtual addresses and the corresponding real addresses. In this prior ad example, each page size is 4096 bytes, the cache is 64 k byte, four-way set associative and the TLB is 128 set, two way associative. Four-way "associativity" means that each set of the cache and directory is comprised of four blocks and directory entries, respectively, with the set of four selected simultaneously during a cache access. Choice of which of the four elements of the set is to be used is made by comparison of the real address from the directory with the real address from the TLB. The element whose real address in the directory is the same as the real address from the TLB contains the desired cache block. The two way TLB associativity means that each set is comprised of two elements, each element containing a virtual/real address pair. Choice of which of the two elements of the set is to be used is made by comparison of the virtual address in the element with the virtual address from the address adder. That element whose virtual address is equivalent with the virtual address from the adder contains the desired real address.

A program instruction 35 provides an operation code such as read or write, a base address operand or pointer (BP), an index address operand or pointer (XP), and a displacement address operand (D), assuming the operation requires memory access. The instruction and its format are decoded by decode hardware 37 which determines the operation to be performed. The base address operand and index address operand point to respective locations in a look-up register array 38 to select a base address component and an index address component. These two components along with the displacement address operand are input to an address generation adder 52; the displacement address operand bypasses the look-up register 38 and is fed directly from the instruction to the address generation adder. The adder circuit 52 comprises eight stages which are described in detail below and summarized as follows: Stage one implements a three-to-two carry save adder (CSA) with the inputs being the base address component, the index address component, and the displacement address operand. Stages 2–8 implement a two-to-one carry-lookahead-adder (CLA). The carry from the CSA is wired into the CLA at the adjacent more significant bit position. The addition is completed in stage eight to yield an unhashed virtual address 53.

Then, the least significant two page bits of the unhashed virtual address VA(46:47) are EXCLUSIVE-ORed with selected most significant bits of the unhashed virtual address VA(30:31) (determined by the data space size) in a hash circuit 54 to produce hashed address 56 for addressing the TLB. This hashing forms stage nine and adds a costly delay to the critical path of addressing the TLB.

Hashed bits VA(46:47) are applied to array access hardware 67 of the TLB to address a set or row in the TLB. The array access hardware 67 requires an appreciable amount of time to obtain the addressed entries in the TLB because the TLB array is large and the array access hardware comprises much logic. This logic includes well known row and column decoders, sense logic for detecting the one and zero state of each bit position, an amplifier for the detected signal and a multiplexer for the columns of enabled rows to produce the output corresponding to the address. Once the unhashed virtual address output is obtained from the addressed set, all the virtual address bits from the address generation adder that are not used in addressing the TLB are compared to the virtual address bits of the selected set, using two comparators 60, to determine whether the unhashed virtual address and corresponding real address are actually contained in the TLB. Two comparators 60 are required because there are two virtual address and corresponding real addresses in each row or set. A multiplexer 63 is used to select the real address, corresponding to the virtual address from the adder, from one of the two entries at the selected set of the TLB if it is resident in the TLB.

The following is a more detailed circuit description of the PRIOR ART adder circuit 52 and hash circuit 54. As previously mentioned, three-to-one adders can be designed by concatenating a three-to-two CSA and a two-to-one CLA adder. The following logic equations define the PRIOR ART adder circuit logic and hash circuit logic. In these equations, $CSAS_i$ represents the sum at bit position i and $CSAC_i$ the carry produced from bit position i into i−1 by the three-to-two CSA (the bits are numbered in ascending order from the most significant bit to the least significant bit). In addition, $S_i$ is the sum from the three-to-one adder, HASH indicates that hashing is to be performed, $H_i$ represents the half sum at i for the CLA, $P_i$ represents the generate, $T_i$ the transmit, at bit i with $c_i$ the carry from bit i into i−1 for the CLA. An N following a symbol indicates the logical not of the signal while a B following a symbol represents buffering of the signal. Finally, $EA_i$ is the effective address at bit i and $HS_i$ is the hashed output from the adder. The symbols used are $\forall$ for EXCLUSIVE-OR, + for logical OR, with logical AND being indicated by adjacency.

STAGE 1:
$CSAS_i = B_i \forall X_i \forall D_i$           $30 \leq i \leq 62$
$CSAC_i = B_i X_i + B_i D_i + X_i D_i$    $31 \leq i \leq 63$
$S_{63} = B_{63} \forall X_{63} \forall D_{63}$
$HASHN = \overline{HASH}$ STAGE 2:
$H_i = CSAS_i \forall CSAC_{i+1}$         $30 \leq i \leq 61$
$PN_i = \overline{CSAS_i\ CSAC_{i+1}}$    $31 \leq i \leq 61$ $TN_i = \overline{CSAS_i + CSAC_{i+1}}$   $31 \leq i \leq 61$ $cN1_{62} = \overline{CSAS_{62}\ CSAC_{63}}$ $S_{62} = CSAS_{62} \forall CSAC_{63}$ STAGE 3:
$HN_i = \overline{H_i}$                   $46 \leq i \leq 53,$
                                          $i = 58, 59$
$P_i^{i+1} = \overline{PN_i(TN_i + PN_{i+1})}$   $31 \leq i \leq 60$ $T_i^{i+1} = \overline{TN_i + TN_{i+1}}$  $31 \leq i \leq 60$ $cB1_{61} = \overline{PN_{61}(TN_{61} + cN1_{62})}$ $cB1_{62} = \overline{cN1_{62}}$ STAGE 4:
$PN_i^{i+3} = \overline{P_i^{i+1} + T_i^{i+1} P_{i+2}^{i+3}}$   $31 \leq i \leq 58$ $TN_i^{i+3} = \overline{T_i^{i+1} T_{i+2}^{i+3}}$   $31 \leq i \leq 58$ $cN2_i = \overline{P_i^{i+1} + T_i^{i+1} cB1_{i+2}}$   $i = 59, 60$ $cN2_i = \overline{cB1_i}$                $i = 61, 62$ $S_i = H_i \forall cB1_{i+1}$             $i = 60, 61$ STAGE 5:
$P_i^{i+7} = \overline{PN_i^{i+3}(TN_i^{i+3} + PN_{i+4}^{i+7})}$   $31 \leq i \leq 54$ $T_i^{i+7} = \overline{TN_i^{i+3} + TN_{i+4}^{i+7}}$   $31 \leq i \leq 54$ $cB2_i = \overline{PN_i^{i+3}(TN_i^{i+3} + cN2_{i+4})}$   $55 \leq i \leq 58$ $cB2_i = \overline{cN2_i}$                $59 \leq i \leq 62$ $S_i = HN_i \forall cN2_{i+1}$            $i = 58, 59$ STAGE 6:
$PN_i^{i+15} = \overline{P_i^{i+7} + T_i^{i+7} P_{i+8}^{i+15}}$   $31 \leq i \leq 46$ $TN_i^{i+15} = \overline{T_i^{i+7} T_{i+8}^{i+15}}$   $31 \leq i \leq 46$ $cN3_i = \overline{P_i^{i+7} + T_i^{i+7} cB2_{i+8}}$   $47 \leq i \leq 54$ $cN3_i = \overline{cB2_i}$                $55 \leq i \leq 62$ $S_i = H_i \forall cB2_{i+1}$             $54 \leq i \leq 57$ STAGE 7:
$cB3_i = \overline{PN_i^{i+15}(TN_i^{i+15} + cN3_{i+16})}$   $31 \leq i \leq 46$ $cB3_i = \overline{cN3_i}$                $47 \leq i \leq 62$ $S_i = HN_i \forall cN3_{i+1}$            $46 \leq i \leq 53$ STAGE 8:
$S_i = H_i \forall cB3_{i+1}$             $30 \leq i \leq 45$ Hashing between address bits 30 and 46, and 31 and 47 can then be performed in Stage 9 by:

STAGE 9:
$HS_i = S_{i-16} \forall S_i$             $i = 46, 47$

This is then followed in Stage 10 by selecting between the hashed address and the un-hashed address to produce the effective address for bits 46 and 47 by:

STAGE 10:
$EA_i = HASH\ HS_i + HASHN\ S_i$          $i = 46, 47$

The critical path in the Prior Art includes the eight stages of addition and two subsequent stages for the hash circuit 54 and selector. The two stages for the hash circuit 54 and selector are implemented after stage eight because the first eight stages of the Prior Art adder 52 produce the most significant address bits which are required for the hash function. The critical path for generating the effective address at 46 and 47 is then:

STAGE 1:
$CSAS_i = B_i \forall X_i \forall D_i$

STAGE 2:
$TN_i = \overline{CSAS_i + CSAC_{i+1}}$

STAGE 3:
$P_i^{i+1} = \overline{PN_i(TN_i + PN_{i+1})}$

STAGE 4:
$PN_i^{i+3} = \overline{P_i^{i+1} + T_i^{i+1} P_{i+2}^{i+3}}$

STAGE 5:
$P_i^{i+7} = \overline{PN_i^{i+3}(TN_i^{i+3} + PN_{i+4}^{i+7})}$

STAGE 6:
$PN_i^{i+15} = \overline{P_i^{i+7} + T_i^{i+7} P_{i+8}^{i+15}}$

STAGE 7:
$cB3_i = \overline{PN_i^{i+15}(TN_i^{i+15} + cN3_{i+16})}$

STAGE 8:

-continued $S_i = H_i \forall cB3_{i+1}$

STAGE 9:
$HS_i = S_{i-16} \forall S_i$

STAGE 10:
$EA_i = HASH\ HS_i + HASHN\ S_i$

Figure 2:
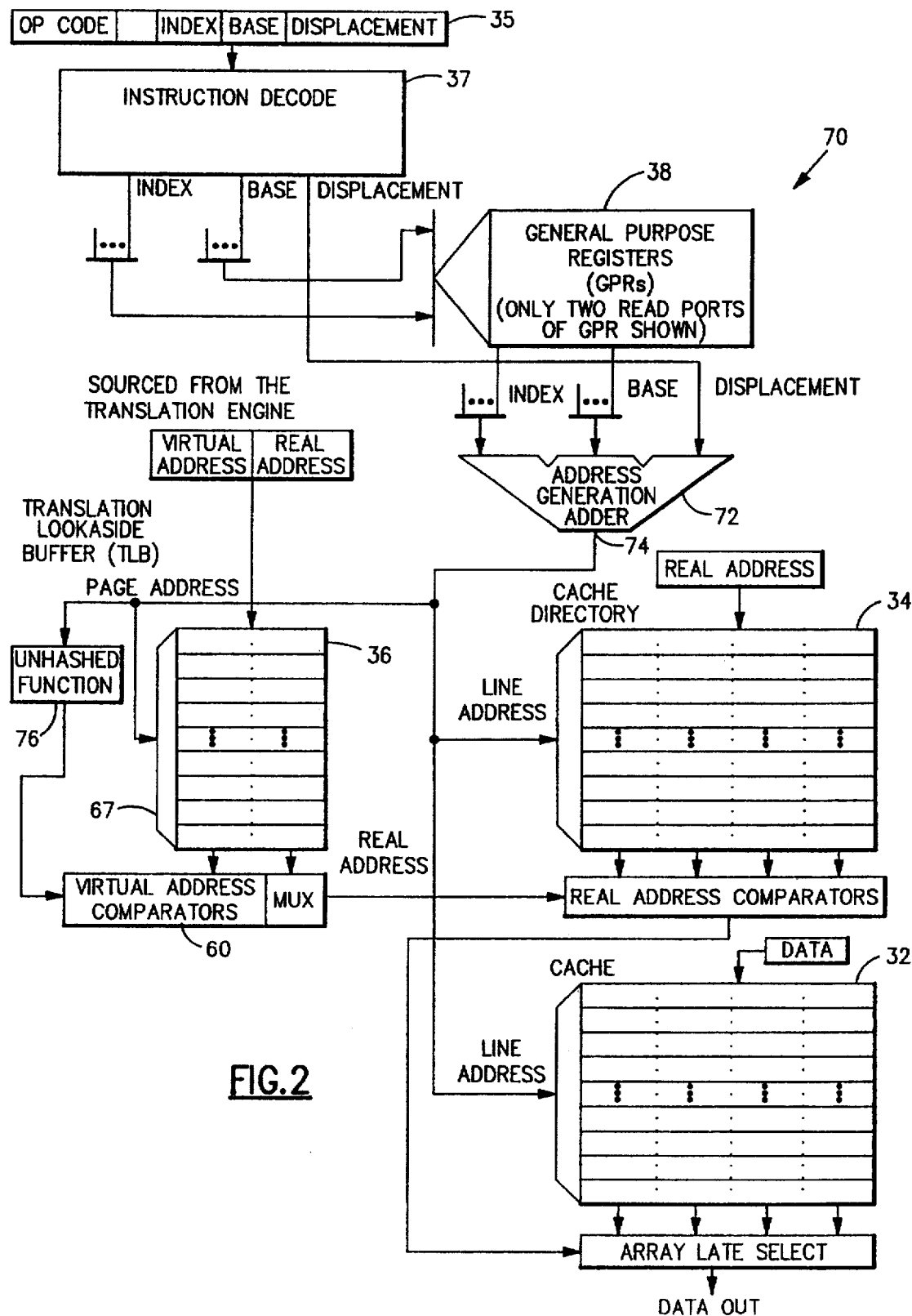
FIG. 2 is a block diagram which illustrates a selectably hashed cache system according to the PRESENT INVENTION.

Therefore, the books in the critical path are:
3WXOR
2WNOR
2×1 OAI
2×1 AOI
2×1 OAI
2×1 AOI
2×1 OAI
2WXOR
2WXOR
2×2 AO FIG. 2 illustrates a selectably hashed cache system generally designated 70 according to the PRESENT INVENTION. Cache system 70 includes the instruction decode hardware 37, look-up register array 38, cache 32, directory 34, array access hardware 67, TLB 36, comparators 60 and multiplexor 63 described above. However, the present invention, includes a novel adder/hashing circuit 72 which combines addition of the base component, index component and displacement operand with hashing so that the hashing and selection of the hashing function does not add to the critical path. The hashing requires plural stages which are either performed in parallel with the addition stages or incorporated into the addition stages to avoid increases to the critical path. Some of these plural stages of the hashing circuitry use outputs from intermediary addition stages. In the embodiment described by the following equations, the adder/hashing circuit 72 processes sixty four bits, (0–63) with bit sixty three being the least significant. The two least significant bits of the data space (bits 31 and 30) of the unhashed virtual address are Exclusive-ORed with two (bits 46 and 47, respectively) of the seven least significant page index bits of the unhashed virtual address used to address the 128 set TLB to yield the hashed virtual address. However, it should be noted that the concepts of the present invention can be used with address operands and/or address components of different lengths and with different numbers of page bits and/or data space bits, and with different bits used for hashing. Before defining the specific logic of the adder/hashing circuit 72, other design criteria are considered.

Custom and semi-custom designs prefer that the logic be regular, i.e. comprised of standard logic modules or books. A fast, regular CLA can be designed by employing inverting logic that consists of alternate stages of 2×1 AOI and 2×1 OAI books in the critical path. This adder trades off the number of book stages required to produce the results for regularity in the design. The books employed, however, are small and fast. These characteristics along with the regularity that allows efficient semi-custom placement of the books allows reduced wiring delays and the achievement of a fast two-to-one CLA. The previous description of the PRIOR ART three-to-one address generation adder, hashing circuitry, and selection between hashed and unhashed address also used these books in the Boolean equations specifying the operation. In that description, the calculation of the selectable hashed virtual address was shown to take ten logic stages.

Adder/hashing circuit 72 of the Present Invention requires only eight stages. Stage one implements a three-to-two carry save adder (CSA), and in parallel, inverts a hash on (logic one) signal for subsequent use. Stage two implements a first stage of a two-to-one carry lookahead adder (CLA) using sum and carry outputs of CSA, which outputs were generated in stage one. In parallel with the first stage of the CLA, other hardware within adder/hashing circuit 72 implements in stage two, two initial steps of a hashing function using the hash on or off signal, CSA output sum bits 31 and 32, and CSA output carry bits 32 and 33. These two hashing function steps generate carry bits, if any, that are needed for calculating the address bit at positions 31 and 30 used to hash 46 and 47. When hashing is desired, these carries are calculated, otherwise they are zeroed. (Either a bit in a program instruction or a hard wired switch can provide the signal whether or not to hash.) In stage three, the results of the first two initial stages of the hashing function are logically combined with generate and transmit outputs of the first stage of the CLA in the second stage of the CLA. Also stage three implements in parallel other hashing steps based on outputs from the first stage of the CLA and outputs from the two hashing steps of stage two. Stages four to seven implement the CLA and other parallel hashing steps, using outputs from previous hashing operations and previous stages of the CLA. Stage eight completes the generation of the hashed virtual address. These eight stages are implemented by logical circuits that correspond one-to-one and are directly represented by the following set of logic equations. Because the steps of the hashing and hash enabling function are implemented in parallel with the calculation of a two-to-one CLA, only eight logic stages are required for generating the selected hashed address as compared to the ten stages required by PRIOR ART.

Figure 4:
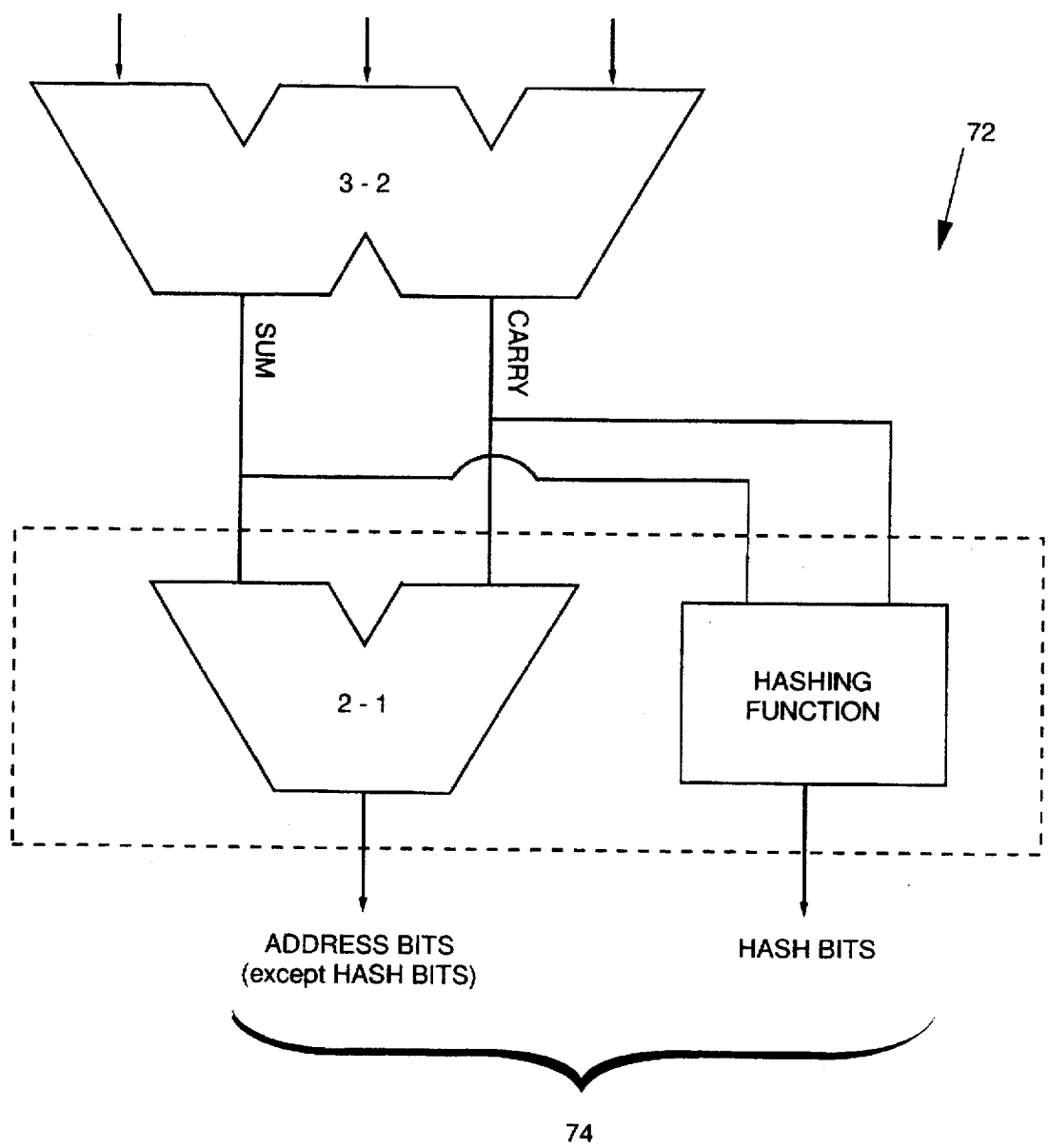
FIG. 4 is a more detailed block diagram of an address generation adder unit 72 of FIG. 2.
Figure 6A:
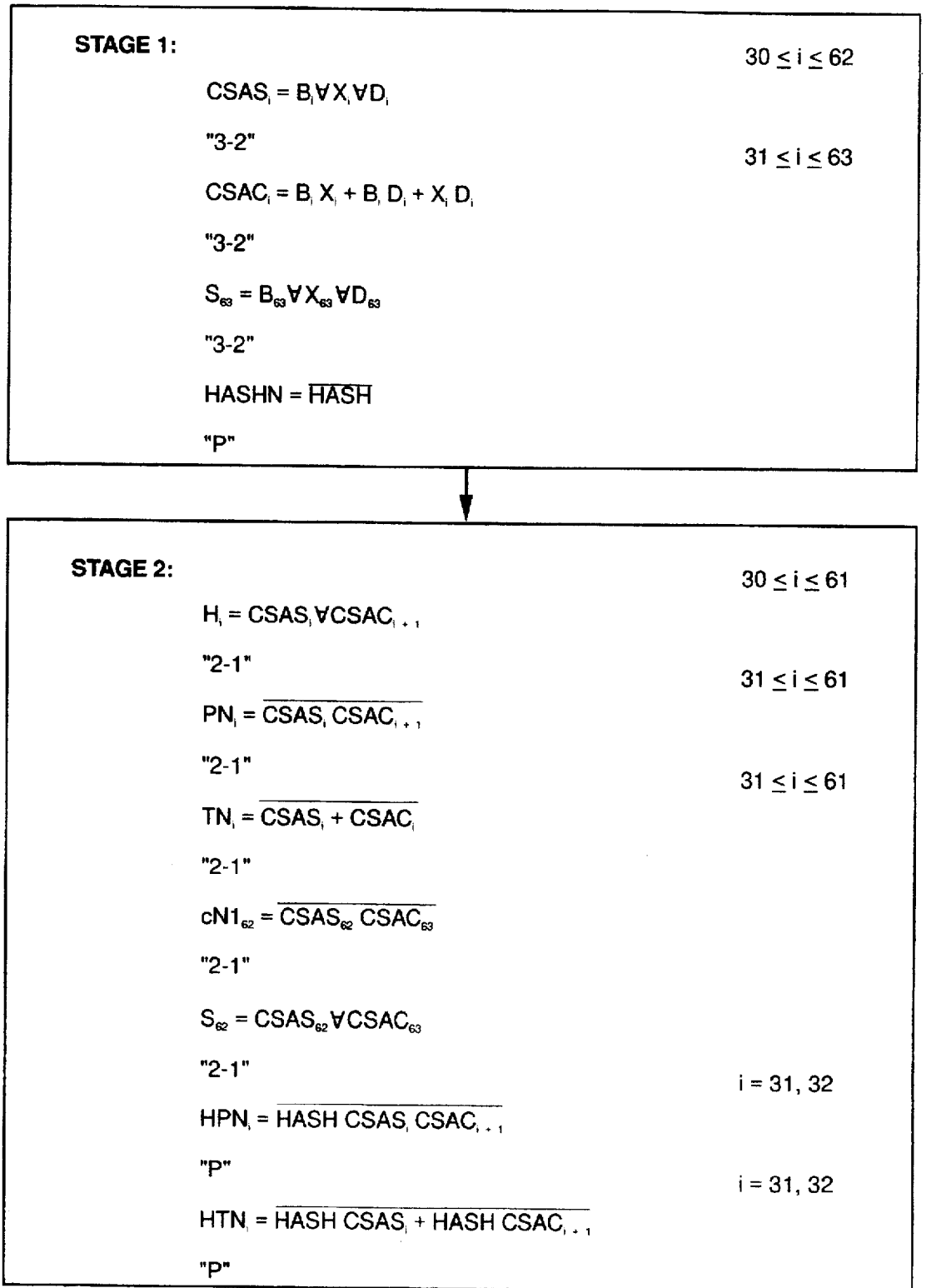

In these equations, identical symbols are used as above with the addition of: $HP_i$ represents the generate ANDed with HASH, $HT_i$ represents the transmit ANDed with HASH, $HH_i$ represents the half sum ANDed with HASH, $HHXH_i$ represents HH at i−15 EXCLUSIVE-ORed with the half sum at i, and $Hc_i$ represents the carry ANDed with HASH. Bit 63 is the least significant bit. Each of the steps using the 3-2 adder is indicated by "3-2", each of the steps using the 2-1 adder is indicated by "2-1" and each of the steps using the parallel circuitry is indicated by "P" which indicates that this step is implemented with other hardware in parallel with the addition steps of the same stage. See also FIGS. 4 and 6(a–d).

STAGE 1:
$CSAS_i = B_i \forall X_i \forall D_i$      $30 \leq i \leq 62$
"3-2"

$CSAC_i = B_i X_i + B_i D_i + X_i D_i$      $31 \leq i \leq 63$
"3-2"

$S_{63} = B_{63} \forall X_{63} \forall D_{63}$
"3-2"

$HASHN = \overline{HASH}$

37P"

STAGE 2:

$H_i = CSAS_i \forall CSAC_{i+1}$      $30 \leq i \leq 61$
"2-1"

$PN_i = \overline{CSAS_i\ CSAC_{i+1}}$      $31 \leq i \leq 61$

"2-1"

$TN_i = \overline{CSAS_i + CSAC_{i+1}}$      $31 \leq i \leq 61$

"2-1"

$cN1_{62} = \overline{CSAS_{62} \, CSAC_{63}}$

"2-1"

$S_{62} = \overline{CSAS_{62} \forall CSAC_{63}}$

"2-1"

$HPN_i = \overline{HASH\,CSAS_i\,CSAC_{i+1}}$   $i = 31, 32$

"P"

$HTN_i = \overline{HASH\,CSAS_i + HASH\,CSAC_{i+1}}$   $i = 31, 32$

"P"

STAGE 3:
$HN_i = \overline{H_i}$   $46 \leq i \leq 53, i = 58, 59$

"2-1"

$P_i^{i+1} = \overline{PN_i(TN_i + PN_{i+1})}$   $31 \leq i \leq 60$

"2-1"

$T_i^{i+1} = \overline{TN_i + TN_{i+1}}$   $31 \leq i \leq 60$

"2-1"

$cB1_{61} = \overline{PN_{61}(TN_{61} + cN1_{61})}$

"2-1"

$cB1_{62} = \overline{cN1_{62}}$

"2-1"

$HP_i^{i+1} = \overline{HPN_i(HTN_i + PN_{i+1})}$   $i = 31, 32$

"P"

$HT_i^{i+1} = \overline{HTN_i + TN_{i+1}}$   $i = 31, 32$

"P"

$HHN_i = \overline{HASH\,H_i}$   $i = 30, 31$

"P"

STAGE 4:
$PN_i^{i+3} = \overline{P_i^{i+1} + T_i^{i+1} P_{i+2}^{i+3}}$   $31 \leq i \leq 58$

"2-1"

$TN_i^{i+3} = \overline{T_i^{i+1} T_{i+2}^{i+3}}$   $31 \leq i \leq 58$

"2-1"

$cN2_i = \overline{P_i^{i+1} + T_i^{i+1} cB1_{i+2}}$   $i = 59, 60$

"2-1"

$cN2_i = \overline{cB1_i}$   $i = 61, 62$

"2-1"

$S_i = H_i \forall cB1_{i+1}$   $i = 60, 61$

"2-1"

$HPN_i^{i+3} = \overline{HP_i^{i+1} + HT_i^{i+1} P_{i+2}^{i+3}}$   $i = 31, 32$

"P"

$HTN_i^{i+3} = \overline{HT_i^{i+1} T_{i+2}^{i+3}}$   $i = 31, 32$

"P"

$HHXHN_i = \overline{HHN_{i-16} \forall H_i}$   $i = 46, 47$

"P"

STAGE 5:
$P_i^{i+7} = \overline{PN_i^{i+3}(TN_i^{i+3} + PN_{i+4}^{i+7})}$   $31 \leq i \leq 54$

"2-1"

$T_i^{i+7} = \overline{TN_i^{i+3} + TN_{i+4}^{i+7}}$   $31 \leq i \leq 54$

"2-1"

$cB2_i = \overline{PN_i^{i+3}(TN_i^{i+3} + cN2_{i+4})}$   $55 \leq i \leq 58$

"2-1"

$cB2_i = \overline{cN2_i}$   $59 \leq i \leq 62$

"2-1"

$S_i = HN_i \forall cN2_{i+1}$   $i = 58, 59$

"2-1"

$HP_i^{i+7} = \overline{HPN_i^{i+3}(HTN_i^{i+3} + PN_{i+4}^{i+7})}$   $i = 31, 32$

"P"

$HT_i^{i+7} = \overline{HTN_i^{i+3} + TN_{i+4}^{i+3}}$   $i = 31, 32$

"P"

STAGE 6:
$PN_i^{i+15} = \overline{P_i^{i+7} + T_i^{i+7} P_{i+8}^{i+15}}$   $31 \leq i \leq 46$

"2-1"

$TN_i^{i+15} = \overline{T_i^{i+7} T_{i+8}^{i+15}}$   $31 \leq i \leq 46$

"2-1"

$cN3_i = \overline{P_i^{i+7} + T_i^{i+7} cB2_{i+8}}$   $47 \leq i \leq 54$

"2-1"

$cN3_i = \overline{cB2_i}$   $55 \leq i \leq 62$

"2-1"

$S_i = H_i \forall cB2_{i+1}$   $54 \leq i \leq 57$

"2-1"

$HPN_i^{i+15} = \overline{HP_i^{i+7} + HT_i^{i+7} P_{i+8}^{i+15}}$   $i = 31, 32$

"P"

$HTN_i^{i+15} = \overline{HT_i^{i+7} T_{i+8}^{i+15}}$   $i = 31, 32$

"P"

STAGE 7:
$cB3_i = \overline{PN_i^{i+15}(TN_i^{i+15} + cN3_{i+16})}$   $31 \leq i \leq 46$

"2-1"

$cB3_i = \overline{cN3_i}$   $47 \leq i \leq 62$

"2-1"

$S_i = HN_i \forall cN3_{i+1}$   $46 \leq i \leq 53$

"2-1"

$HHXHXc_i = \overline{HHXHN_i \forall cN3_{i+1}}$   $i = 46, 47$

"P"

$HcB3_i = \overline{HPN_i^{i+15}(HTN_i^{i+15} + cN3_{i+16})}$   $i = 31, 32$

"P"

STAGE 8:
$EA_i = HcB3_{i-15} \forall HHXHXc_i$   $i = 46, 47$

"P"

The critical path for this adder is

STAGE 1:
$CSAS_i = B_i \forall X_i \forall D_i$

STAGE 2:

-continued $$HTN_i = \overline{HASH\ CSAS_i} + \overline{HASH\ CSAC_{i+1}}$$

STAGE 3:
$$HP_i^{j+1} = \overline{HPN_i(HTN_i + PN_{i+1})}$$

STAGE 4:
$$HPN_i^{j+3} = \overline{HP_i^{j+1} + H + T_i^{j+1} P_{i+2}^{j+3}}$$

STAGE 5:
$$HP_i^{j+7} = \overline{HPN_i^{j+3}(HTN_i^{j+3} + PN_{i+4}^{j+7})}$$

STAGE 6:
$$HPN_i^{j+15} = \overline{HP_i^{j+7} + HT_i^{j+7} P_{i+8}^{j+15}}$$

STAGE 7:
$$HcB3_i = \overline{HPN_i^{j+15}(HTN_i^{j+15} + cN3_{i+16})}$$

STAGE 8:
$$EA_i = HcB3_{i-15} \lor HHXHXc_i$$

Therefore, the books in the critical path to produce the hashed effective address are:

3WXOR
2×2 AOI
2×1 OAI
2×1 AOI
2×1 OAI
2×1 AOI
2×1 OAI
2WXOR

As noted above, the critical path of the Prior Art, i.e. adder circuit 52, hash circuit 54 and multiplexer 61 requires ten stages of logic books to produce the selectably hashed or un-hashed virtual address whereas the critical path of the Present Invention, i.e. adder/hashing circuit 72 requires only eight stages of logic books to produce the selectably hashed or un-hashed virtual address. Moreover, the books traversed for the eight stages of the critical path of the Present Invention are identical to the books of the first eight stages of the critical path of the Prior Art, except that a 2W-NOR is replaced with a 2×2 AOI. Therefore, the adder/hashing circuit 72 of the Present Invention produces a selectably hashed address in an equivalent number of logic stages as the Prior Art requires to produce the unhashed virtual address so there is no "penalty" for incorporating the selectable hash function within the Present Invention. Also, because the eight books in the critical path for the adder/hashing circuit of the Present Invention are nearly identical to the books required by the Prior Art adder to produce the unhashed virtual address, the time required to produce the hashed address in the Present Invention is approximately the same as the time required to produce the unhashed virtual address of the Prior Art. (In an IBM ESA/370 architecture, the full delay of the 2×2-AOI in the second stage would not be incurred because the use of a 12 bit displacement allows the replacement of the 3W-XOR in the first stage with a faster 2W-XOR at bit positions 31 and 32.) Therefore, the hashing function of the Present Invention does not add to the critical path.

In the following, the result from the adder/hashing circuit 72 of the Present Invention is shown to be logically equivalent to the result from the adder circuit 52 and hash circuit 54 of the Prior Art. First consider $HcB3_i$ of the result of the Present Invention. By successively substituting values calculated in previous stages of the design, $HcB3_i$ can be rewritten as follows.

$$HcB3_i = \overline{HPN_i^{j+15}(HTN_i^{j+15} + cN3_{i+16})}$$
$$= \overline{HPN_i^{j+15}} + \overline{HTN_i^{j+15}} \quad \overline{cN3_{i+16}}$$
$$= \overline{HP_i^{j+7} + HT_i^{j+7} P_{i+8}^{j+15}} + \overline{HT_i^{j+7} T_{i+8}^{j+15}} c_{i+16}$$
$$= \overline{HPN_i^{j+3}} + \overline{HTN_i^{j+3}} \quad \overline{PN_{i+4}^{j+7}} + \overline{HTN_i^{j+3}} \quad \overline{TN_{i+4}^{j+7}} P_{i+8}^{j+15} +$$
$$\overline{HTN_i^{j+3}} \quad \overline{TN_{i+4}^{j+7}} T_{i+8}^{j+15} c_{i+16}$$

$$= HP_i^{j+1} + HT_i^{j+1} P_{i+2}^{j+3} + HT_i^{j+1} T_{i+2}^{j+3}(P_{i+4}^{j+5} + T_{i+4}^{j+5} P_{i+6}^{j+7}) +$$
$$HT_i^{j+1} T_{i+2}^{j+3} T_{i+4}^{j+5} T_{i+6}^{j+7} P_{i+8}^{j+15} +$$
$$HT_i^{j+1} T_{i+2}^{j+3} T_{i+4}^{j+5} T_{i+6}^{j+7} T_{i+8}^{j+15} c_{i+16}$$

$$= HP_i^{j+1} + HT_i^{j+1}(P_{i+2}^{j+3} + T_{i+2}^{j+3} P_{i+4}^{j+5} + T_{i+2}^{j+3} T_{i+4}^{j+5} P_{i+6}^{j+7} +$$
$$T_{i+2}^{j+3} P_{i+8}^{j+15} T_{i+2}^{j+15} c_{i+16})$$

$$= HP_i^{j+1} + HT_i^{j+1} c_{i+2}$$

$$= \overline{HPN_i} + \overline{HTN_i} \quad \overline{PN_{i+1}} + \overline{HTN_i} \quad \overline{TN_{i+1}} c_{i+2}$$

$$= \overline{HASH\ CSAS_i\ CSAC_{i+1}} + \overline{HASH\ (CSAS_i + }$$
$$CSAC_{i+1})(CSAS_{i+1}\ CSAC_{i+2}) +$$
$$\overline{HASH\ (CSAS_i + CSAC_{i+1})(CSAS_{i+1} + CSAC_{i+2})} c_{i+2}$$

$$= \overline{HASH\ (P_i + T_i P_{i+1} + T_i T_{i+1} c_{i+2})}$$

$$= \overline{HASH\ c_i}$$

Next, consider $HHXHXc_i$. As for $HcB3_i$, this can be rewritten by successively substituting values generated from previous stages in the device. The result is:

$$HHXHXc_i = HHXHN_i \lor cN3_{i+1}$$
$$= HHN_{i-16} \lor H_i \lor cn3_{i+1}$$
$$= \overline{(HASH\ H_{i-16}) \lor H_i \lor c_{i+1}}$$
$$= (HASH\ H_{i-16}) \lor H_i \lor c_{i+1}$$

Substituting this result as well as the previous result for $HcB3_i$ into the expression for EA produces:

$$EA_i = HcB3_{i-15} \lor HHXHXc_i$$
$$= (HASH\ c_{i-15}) \lor (HASH\ H_{i-16}) \lor H_i \lor c_{i+1}$$

Using the identity, $$(A \lor AC) = A\ (B \lor C)$$

where A, B, and C represent Boolean variables, then EA can be expressed as:

$$EA_i = [HASH\ (H_{i-16} \lor c_{i-15})] \lor H_{ii} \lor c_{i+1}$$
$$= (HASH\ S_{i-16}) \lor S_i$$

By manipulating this last result, the equivalence of the result of the adder/hashing circuit 72 of the present invention with that of the Prior Art can be seen. The required manipulations follow.

$$EA_i = (HASH\ S_{i-16}) \lor S_i$$
$$= (HASH\ S_{i-16})\ \overline{S_i} + \overline{(HASH\ S_{i-16})}\ S_i$$
$$= (HASH\ S_{i-16})\ \overline{S_i} + (\overline{HASH} + \overline{S_{i-16}})\ S_i$$
$$= (HASH\ S_{i-16})\ \overline{S_i} + [(\overline{HASH} + \overline{HASH})\ (\overline{HASH} + \overline{S_{i-16}})\ S_i]$$
$$= (HASH\ S_{i-16})\ \overline{S_i} + (HASH\ \overline{S_{i-16}} + \overline{HASH})\ S_i$$
$$= HASH\ S_{i-16}\ \overline{S_i} + HASH\ \overline{S_{i-16}}\ S_i + \overline{HASH}\ S_i$$
$$= HASH\ (S_{i-16}\ \overline{S_i} + \overline{S_{i-16}}\ S_i) + \overline{HASH}\ S_i$$
$$= HASH\ (S_{i-16} \lor S_i) + \overline{HASH}\ S_i$$

Substituting i=46 and i=47 into the last equation produces:

$$EA_{46} = HASH\ (S_{30} \lor S_{46}) + \overline{HASH}\ S_{46}$$
$$EA_{47} = HASH\ (S_{31} \lor S_{47}) + \overline{HASH}\ S_{47}$$

Therefore, the adder/hashing circuit 72 of the Present Invention produces the same result as the adder 52 in series with the hasher 54 of the Prior Art while the adder/hashing circuit 72 has a shorter critical path. This result is the virtual address when HASH is a logic zero (off) or a hashed address created as an EXCLUSIVE-OR between two bits of the virtual address when HASH is a logic one (on).

Alternate Embodiment of the Present Invention

Figure 3:
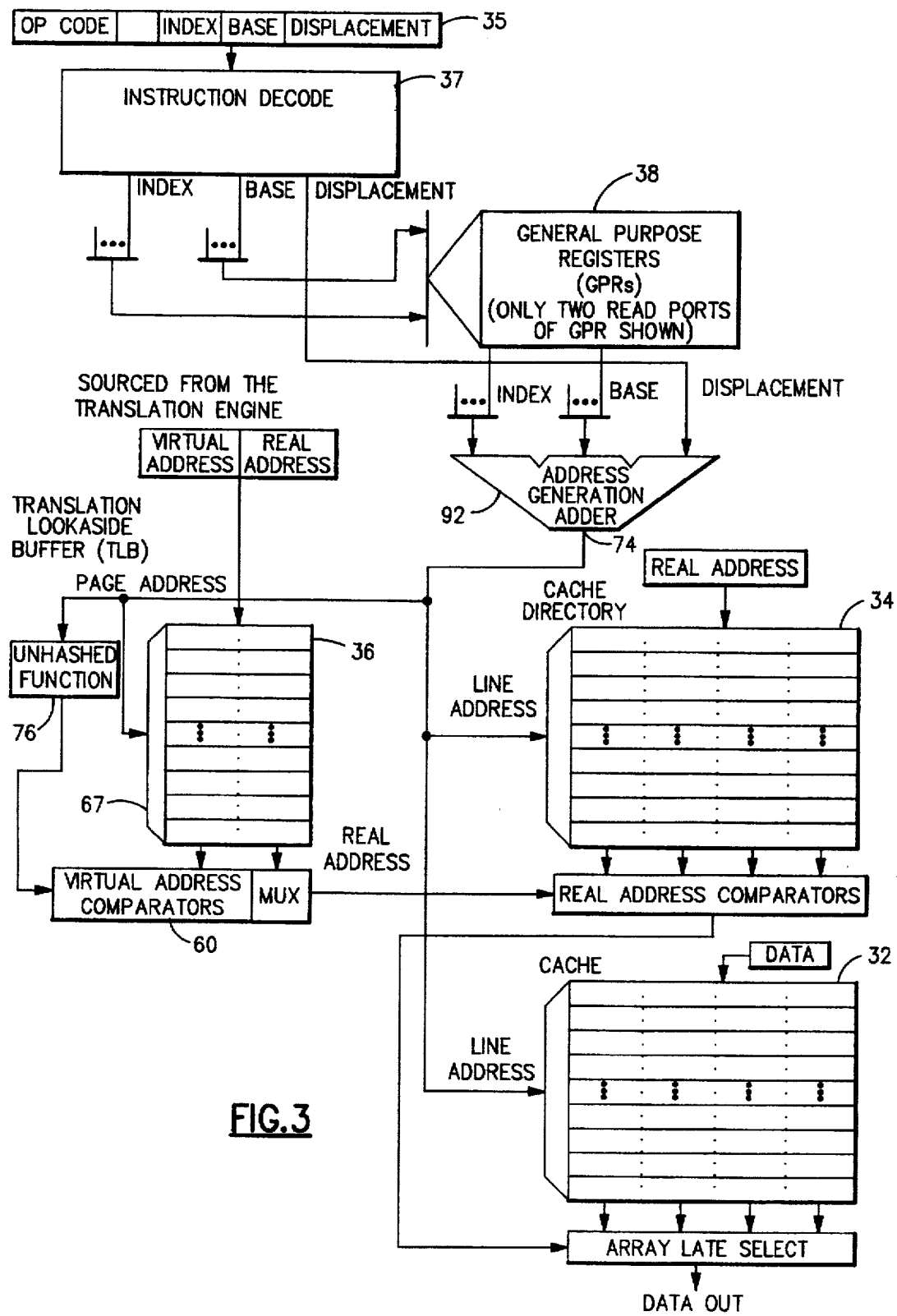
FIG. 3 is a block diagram which illustrates a selectably hashed cache system according to an alternate embodiment of the PRESENT INVENTION.

FIG. 3 illustrates an alternate embodiment of the present invention in which an adder/hashing circuit 92 replaces the adder/hashing circuit 72 of FIG. 2. The adder/hashing circuit 92 comprises a 3-2 adder, a 2-1 adder following the 3-2 adder, and parallel circuitry which participates in the hashing function. In this embodiment, the base component (obtained from the base register) is sixty four bits, thirty two identifying the data space and thirty two bits identifying the page within the data space. The index component is thirty two bits (of the same significance as the page bits of the base component), and the displacement operand is thirty-two bits (of the same significance as the least significant twelve page bits). Therefore, the adder need only accommodate thirty two bits (LSB). In this embodiment, the carry, if any, from the MSB of the adder is ignored, so the thirty two most significant bits of the base component bypass the adder so that the two least significant data space bits (bits thirty two and thirty one) are immediately available for a hashing step in stage one, and available for another hashing step in stage four using partial sums that are generated within the adder/hashing circuit 72. This permits the critical path to be reduced by one stage as described below.

Figure 5:
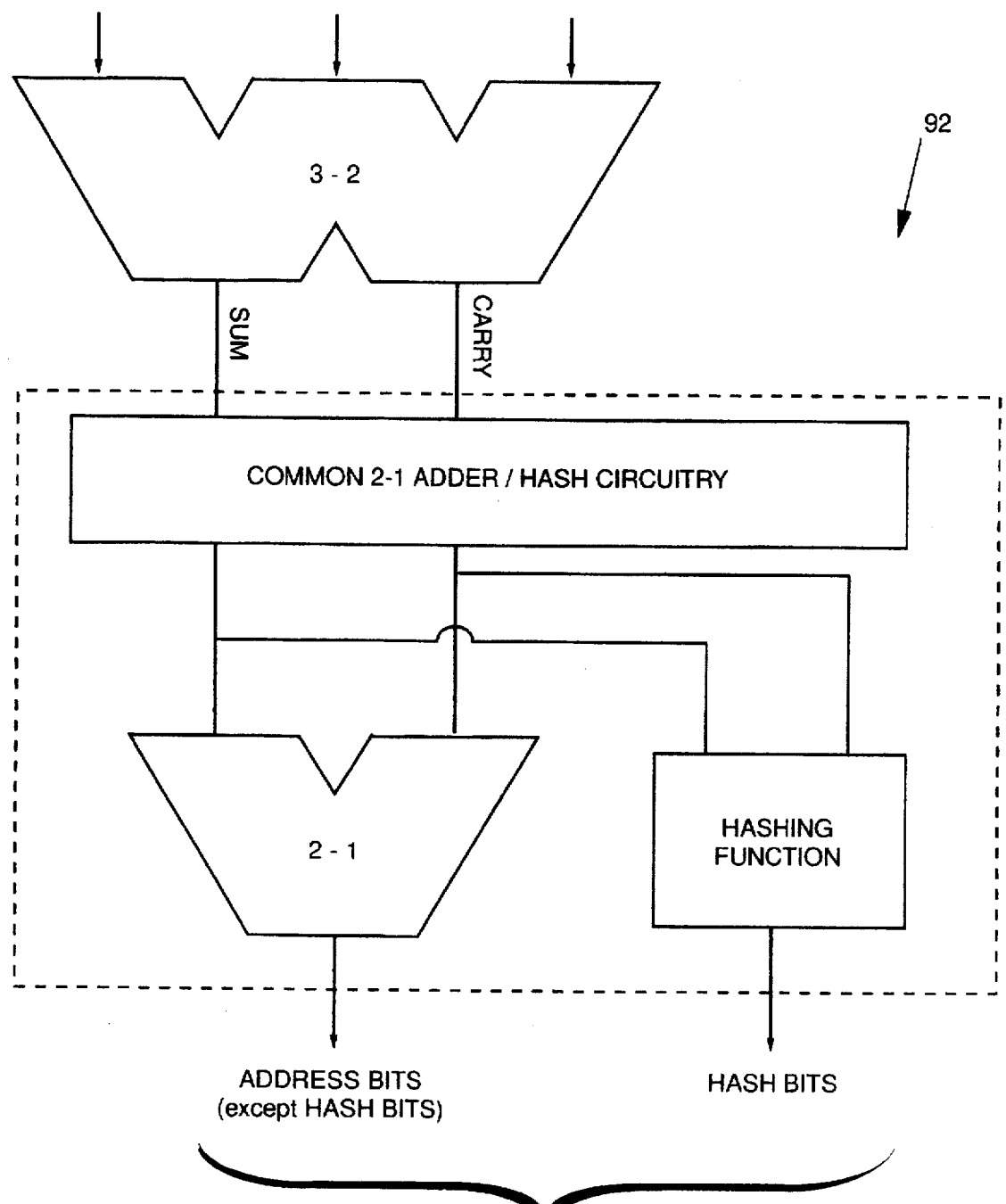
FIG. 5 is a more detailed block diagram of an address generation adder unit 92 of FIG. 3.

The following equations define the adder/hashing circuit 92 in which the symbols are the same as above. As above, bit 63 is the least significant bit. Each of the steps using the 3-2 adder is indicated by "3-2", each of the steps using the 2-1 adder is indicated by "2-1" and each of the steps using the parallel circuitry is indicated by "P" which indicates that these parallel circuitry steps are implemented in parallel with the addition steps of the same stage. See also FIGS. 5 and 7(a–d)

STAGE 1:
$CSAS_i = B_i \forall X_i \forall D_i$  "3-2"  $30 \leq i \leq 62$ $CSAC_i = B_i X_i + B_i D_i + X_i D_i$  "3-2"  $31 \leq i \leq 63$ $S_{63} = B_{63} \forall X_{63} \forall D_{63}$  "3-2"

$HS_i = HASH\ S_i$  "P"  $i = 30, 31$

STAGE 2:
$H_i = \overline{CSAS_i \forall CSAC_{i+1}}$  "2-1"  $30 \leq i \leq 61$ $PN_i = \overline{CSAS_i\ CSAC_{i+1}}$  "2-1"  $31 \leq i \leq 61$ $TN_i = \overline{CSAS_i + CSAC_{i+1}}$  "2-1"  $31 \leq i \leq 61$ $cN1_{62} = \overline{CSAS_{62}\ CSAC_{63}}$  "2-1"

$S_{62} = CSAS_{62} \forall CSAC_{63}$  "2-1"

STAGE 3:
$HN_i = H_i$  $46 \leq i \leq 53, i = 58, 59$  "2-1"

$P_i^{i+1} = \overline{PN_i(TN_i + PN_{i+1})}$  "2-1"  $31 \leq i \leq 60$ $T_i^{i+1} = \overline{TN_i + TN_{i+1}}$  "2-1"  $31 \leq i \leq 60$ $cB1_{61} = \overline{PN_{61}(TN_{61} + cN1_{62})}$  "2-1"

$cB1_{62} = \overline{cN1_{62}}$  "2-1"

STAGE 4:
$PN_i^{i+3} = \overline{P_i^{i+1} + T_i^{i+1} P_{i+2}^{i+3}}$  "2-1"  $31 \leq i \leq 58$ $TN_i^{i+3} = \overline{T_i^{i+1}\ T_{i+2}^{i+3}}$  "2-1"  $31 \leq i \leq 58$ $cN2_i = \overline{P_i^{i+1} + T_i^{i+1}\ cB1_{i+2}}$  "2-1"  $i = 59, 60$ $cN2_i = \overline{cB1_i}$  "2-1"  $i = 61, 62$ $S_i = H_i \forall cB1_{i+1}$  "2-1"  $i = 60, 61$ $HSXHN_i = HS_{i-15} \forall HN_i$  "P"  $i = 46, 47$ STAGE 5:
$P_i^{i+7} = \overline{PN_i^{i+3}(TN_i^{i+3} + PN_{i+4}^{i+7})}$  "2-1"  $31 \leq i \leq 54$ $T_i^{i+7} = \overline{TN_i^{i+3} + TN_{i+4}^{i+7}}$  "2-1"  $31 \leq i \leq 54$ $cB2_i = \overline{PN_i^{i+3}(TN_i^{i+3} + cN2_{i+4})}$  "2-1"  $55 \leq i \leq 58$ $cB2_i = \overline{cN2_i}$  "2-1"  $59 \leq i \leq 62$ $S_i = HN_i \forall cN2_{i+1}$  "2-1"  $i = 58, 59$ STAGE 6:
$PN_i^{i+15} = \overline{P_i^{i+7} + T_i^{i+7} P_{i+8}^{i+15}}$  "2-1"  $31 \leq i \leq 46$ $TN_i^{i+15} = \overline{T_i^{i+7}\ T_{i+8}^{i+15}}$  "2-1"  $31 \leq i \leq 46$ $cN3_i = \overline{P_i^{i+7} + T_i^{i+7}\ cB2_{i+8}}$  "2-1"  $47 \leq i \leq 54$ $cN3_i = cB2_i$  "2-1"  $55 \leq i \leq 62$ $S_i = H_i \forall cB2_{i+1}$  "2-1"  $54 \leq i \leq 57$ -continued STAGE 7:
$$cB3_i = \overline{PN_i^{j+15} \ (TN_i^{j+15} + cN3_{i+16})} \qquad 31 \leq i \leq 46$$
"2-1"

$$cB3_i = \overline{cN3_i} \qquad 47 \leq i \leq 62$$
"2-1"

$$S_i = HN_i \forall cN3_{i+1} \qquad 46 \leq i \leq 53$$
"2-1"

$$EA_i = HSXHN_i \forall CN3_{i+1} \qquad i = 46, 47$$
"P"

STAGE 8:
$$S_i = H_i \forall cB3_{i+1} \qquad 30 \leq i \leq 45$$
"2-1"

In this case, the hashed address for bits 46 and 47 is produced in one less logic stage than address 45 that is also used to access the TLB. The critical path in producing the hashed address is:

STAGE 1:
$$CSAS_i = B_i \forall X_i \forall D_i$$

STAGE 2:
$$TN_i = \overline{CSAS_i + CSAC_{i+1}}$$

STAGE 3:
$$P_i^{j+1} = \overline{PN_i(TN_i + PN_{i+1})}$$

STAGE 4:
$$PN_i^{j+3} = \overline{P_i^{j+1} + T_i^{j+1} P_{i+2}^{j+3}}$$

STAGE 5:
$$P_i^{j+7} = \overline{PN_i^{j+3} \ (TN_i^{j+3} + PN_{i+4}^{j+3})}$$

STAGE 6:
$$PN_i^{j+15} = \overline{P_i^{j+7} + T_i^{j+7} P_{i+8}^{j+15}}$$

STAGE 7:
$$EA_i = HSXHN_i \forall CN3_{i+1}$$

Therefore, the books in the critical path are:
3WXOR
2WNOR
2×1 OAI
2×1 AOI
2×1 OAI
2×1 AOI
2WXOR Creating the un-hashed Address for TLB comparisons As noted above, the least significant page bits VA(45:51) are used to address or select a set or row in the TLB. After the set is selected, the virtual address in the set must be compared to the unhashed virtual address to determine if the virtual address is in fact represented in the TLB. If so (a TLB hit), then the corresponding real address can be read from the TLB without performing a time consuming address translation. Thus, the hashed output from the adder/hashing circuit 72 or 92 must be unhashed for use in comparison to the virtual address in the addressed TLB set. To avoid delay, the un-hashing is performed in parallel with the addressing of the TLB. As noted above, many steps are required to select a set in the TLB once the hashed TLB address is supplied. During this time the hashed virtual address can be unhashed. Because the TLB likely resides on a separate chip from the adder/hashing circuit 72, the un-hashed address can be created with unhashing circuitry 76 on the TLB chip to minimize the number of I/O pins. To create the un-hashed virtual address, the following property of the EXCLUSIVE-OR function is used: $A \forall A = 0$. Since the hashed address, $EA_i$, is created by an EXCLUSIVE-OR between $S_{i-16}$ and $S_i$, then EXCLUSIVE-ORing the hashed address with $S_{i-16}$ produces:

$$S_{i-16} \forall (S_{i-16} \forall S_i) = S_{i-16} \forall S_{i-16} \forall S_i = S_i$$

From this result, the un-hashed address ($UEA_i$) can be produced by:

$$UEA_i = HASH \ (S_{i-16} \forall EA_i) + \overline{HASH} \ EA_i$$

Therefore, creating $UEA_i$ is accomplished by 2W-XOR followed by a 2-1 multiplexer (2×2 AO). Because this function is performed in parallel with addressing of the TLB, the un-hashing function does not reside in or add to the critical path. Therefore, the un-hashed virtual address is available for executing the comparison by the time that the corresponding virtual address is read from the TLB array.

Based on the foregoing, cache systems embodying the present invention have been disclosed. However, numerous modifications and substitutions can be made without deviating from the scope of the present invention. For example, the cache systems could be used in an environment where one or more address operands are supplied directly from the program instruction into the adder/hashing circuit or in which two, rather than three, address operands or components are added to form the address. Also, the addresses which are supplied to the adder/hashing circuit need not be divided between page bits and data space bits, but could all be page bits from a single storage area. Also, an adder/hashing circuit according to the present invention could be used with different length addresses, different data space addressing bits, or different page addressing bits than those disclosed. Also, if desired, the directory and TLB can store some type of address other than the real address, and the "virtual" address stored by the TLB can be any of a variety of types for which the TLB provides the corresponding address type found in the cache directory. In addition, the hashed address output from the adder/hashing circuit can be used to access a cache directory and cache array as well as the TLB. Therefore, the invention has been disclosed by way of illustration and not limitation, and reference should be made to the following claims to determine the scope of the present invention.

What is claimed is:

1. A cache system comprising:
   a 3-2 adder coupled to receive and add one or more address components based on a program instruction;
   a 2-1 adder coupled to receive and add an output of said 3-2 adder to yield a multiplicity of bits of an address; and
   logic means for hashing an output of said 3-2 adder substantially in parallel with operation of said 2-1 adder to yield at least one other, hashed bit of said address.

2. A cache system as set forth in claim 1 wherein said logic means hashes sum and carry outputs of said 3-2 adder in parallel with operation of said 2-1 adder.

3. A cache system as set forth in claim 1 further comprising:
   a cache for storing data from or for a memory;
   a translation look aside buffer for storing said address and a corresponding, respective address.

4. A cache system as set forth in claim 3 further comprising:

means for selectively unhashing an output of said logic means; and means for comparing an output of the means for selective unhashing to an address within said translation look aside buffer.

5. A cache system comprising:

a translation look aside buffer (TLB) for storing first addresses and corresponding, respective second addresses of data in a cache;

an N-2 adder coupled to receive and add address components based on a program instruction, N being an integer greater than 2;

a 2-1 adder coupled to receive and add an output of said N-2 adder to yield a multiplicity of bits of one of said first addresses; and hashing means, coupled to receive at least one output from said N-2 adder, for performing a hashing operation using bits derived from said at least one output to yield at least one other, hashed bit of said one first address, said hashing operation being performed in parallel with operation of said 2-1 adder.

6. A cache system as set forth in claim 5 further comprising means for identifying from said translation look aside buffer one of said second addresses which corresponds to said one first address.

7. A cache system as set forth in claim 5 further comprising:

a cache for storing data from or for a memory; and a cache directory for storing said second addresses of said data in said cache.

8. A cache system as set forth in claim 5 wherein said N-2 adder is a 3-2 carry save adder, and said 2-1 adder is a 2-1 carry lookahead adder.

9. A cache system comprising:

a translation look aside buffer (TLB) for storing first addresses and corresponding, respective second addresses of data in a cache;

multiple stage adder means, coupled to receive address components based on a program instruction, for adding said address components to yield a multiplicity of bits of one of said first addresses; and hashing means, coupled to receive at least one output from an initial or intermediary stage of said multiple stage adder means, for performing a hashing operation using said at least one output to yield at least one other, hashed bit of said one first address, said hashing operation being performed in parallel with one or more of said stages of said multiple stage adder means.

10. A cache system as set forth in claim 8 further comprising means for identifying from said translation look aside buffer one of said second addresses which corresponds to said one first address.

11. A cache system as set forth in claim 9 further comprising:

a cache for storing data from or for a memory; and a cache directory for storing said second addresses of said data in said cache.

12. A cache system as set forth in claim 9 wherein said multiple stage adder means comprises a 3-2 carry save adder and a 2-1 carry look ahead adder, and said multiple stage adder means and said hashing means implement the following logical equations:

STAGE 1:

$CSAS_i = B_i \lor X_i \lor D_i$  $\quad 30 \leq i \leq 62$ $CSAC_i = B_i X_i + B_i D_i + X_i D_i$  $\quad 31 \leq i \leq 63$ $S_{63} = B_{63} \lor X_{63} \lor D_{63}$ $HS_i = HASH\ S_i$  $\quad i = 30, 31$

STAGE 2:

$H_i = CSAS_i \lor CSAC_{i+1}$  $\quad 30 \leq i \leq 61$ $PN_i = \overline{CSAS_i\ CSAC_{i+1}}$  $\quad 31 \leq i \leq 61$ $TN_i = \overline{CSAS_i + CSAC_{i+1}}$  $\quad 31 \leq i \leq 61$ $cN1_{62} = \overline{CSAS_{62}\ CSAC_{63}}$ $S_{62} = CSAS_{62} \lor CSAC_{63}$

STAGE 3:

$HN_i = H_i$ $46 \leq i \leq 53, i = 58, 59$  $\quad$ "2-1"

$P_i^{i+1} = \overline{PN_i(TN_i + PN_{i+1})}$  $\quad 31 \leq i \leq 60$ $T_i^{i+1} = \overline{TN_i + TN_{i+1}}$  $\quad 31 \leq i \leq 60$ $cB1_{61} = \overline{PN_{61}(TN_{61} + cN1_{62})}$ $cB1_{62} = \overline{cN1_{62}}$

STAGE 4:

$PN_i^{i+3} = \overline{P_i^{i+1} + T_i^{i+1} P_{i+2}^{i+3}}$  $\quad 31 \leq i \leq 58$ $TN_i^{i+3} = \overline{T_i^{i+1} T_{i+2}^{i+3}}$  $\quad 31 \leq i \leq 58$ $cN2_i = \overline{P_i^{i+1} + T_i^{i+1} cB1_{i+2}}$  $\quad i = 59, 60$ $cN2_i = \overline{cB1_i}$  $\quad i = 61, 62$ $S_i = H_i \lor cB1_{i+1}$  $\quad i = 60, 61$ $HSXHN_i = HS_{i-15} \lor HN_i$  $\quad i = 46, 47$

STAGE 5:

$P_i^{i+7} = \overline{PN_i^{i+3}(TN_i^{i+3} + PN_{i+4}^{i+7})}$  $\quad 31 \leq i \leq 54$ $T_i^{i+7} = \overline{TN_i^{i+3} + TN_{i+4}^{i+7}}$  $\quad 31 \leq i \leq 54$ $cB2_i = \overline{PN_i^{i+3}(TN_i^{i+3} + cN2_{i+4})}$  $\quad 55 \leq i \leq 58$ $cB2_i = \overline{cN2_i}$  $\quad 59 \leq i \leq 62$ $S_i = HN_i \lor cN2_{i+1}$  $\quad i = 58, 59$

STAGE 6:

$PN_i^{i+15} = \overline{P_i^{i+7} + T_i^{i+7} P_{i+8}^{i+15}}$  $\quad 31 \leq i \leq 46$ $TN_i^{i+15} = \overline{T_i^{i+7} T_{i+8}^{i+15}}$  $\quad 31 \leq i \leq 46$ $cN3_i = \overline{P_i^{i+7} + T_i^{i+7} cB2_{i+8}}$  $\quad 47 \leq i \leq 54$ $cN3_i = \overline{cB2_i}$  $\quad 55 \leq i \leq 62$ -continued

| | |
|---|---|
| $S_i = H_i \forall cB2_{i+1}$ | $54 \leq i \leq 57$ |

STAGE 7:

| | |
|---|---|
| $cB3_i = \overline{PN_i^{i+15}(TN_i^{i+15} + cN3_{i+16})}$ | $31 \leq i \leq 46$ |
| $cB3_i = \overline{cN3_i}$ | $47 \leq i \leq 62$ |
| $S_i = HN_i \forall cN3_{i+1}$ | $46 \leq i \leq 53$ |
| $EA_i = HSXHN_i \forall CN3_{i+1}$ | $i = 46, 47$ |

STAGE 8:

| | |
|---|---|
| $S_i = H_i \forall cB3_{i+1}$ | $30 \leq i \leq 45$ | wherein $CSAS_i$ represents the sum at bit position i, $CSAC_i$ represents the carry produced from bit position i into i−1 by the 3-2 carry save adder, (the bits being numbered in ascending order from the most significant bit zero to the least significant bit); $S_i$ represents a sum from the multiple stage adder means, $H_i$ represents the half sum at i for said 2-1 carry look ahead adder, $P_i$ represents a generate at bit i, $T_i$ represents a transmit at bit i, $c_i$ represents a carry from bit i into i−1 for said 2-1 carry look ahead adder, $EA_i$ represents an effective address at bit i, $HS_i$ represents a hashed output from said multiple stage adder means, $HP_i$ represents the generate ANDed with HASH, $HT_i$ represents the transmit ANDed with HASH, HASH is set to a logic one when hashing is desired, $HH_i$ represents the half sum ANDed with HASH, $HHXH_i$ represents $HH_i$ at i−15 EXCLUSIVE-ORed with the half sum at i, and $Hc_i$ represents the carry ANDed with HASH, and an N following a symbol represents the logical not of the signal, a B following a symbol represents buffering of the signal, $\forall$ represents an EXCLUSIVE-OR operation, + represents a logical OR operation, and adjacency represents a logical AND operation.

13. A cache system as set forth in claim 9 further comprising means for unhashing said one first address; and means for comparing a result of the means for unhashing with the first addresses in said translation look aside buffer to determine if said translation look aside buffer contains the corresponding second address.

14. A cache system as set forth in claim 9 wherein said first addresses are virtual addresses and said second addresses are real addresses.

15. A cache system as set forth in claim 9 wherein said hashing means has a plurality of stages.

16. A cache system as set forth in claim 9 wherein said multiple stage adder means comprises a 3-2 carry save adder and a 2-1 carry look ahead adder, and said multiple stage adder means and said hashing means implement the following logical equations:

STAGE 1:

| | |
|---|---|
| $CSAS_i = B_i!X_i!D_i$ | $30 \leq i \leq 62$ |
| $CSAC_i = B_i X_i + B_i D_i + X_i D_i$ | $31 \leq i \leq 63$ |
| $S_{63} = B_{63}!X_{63}!D_{63}$ $HASHN = \overline{HASH}$ | |

STAGE 2:

| | |
|---|---|
| $H_i = \overline{CSAS_i!CSAC_{i+1}}$ | $30 \leq i \leq 61$ |
| $PN_i = \overline{CSAS_i CSAC_{i+1}}$ | $31 \leq i \leq 61$ |
| $TN_i = \overline{CSAS_i + CSAC_i}$ | $31 \leq i \leq 61$ |

-continued

| | |
|---|---|
| $cN1_{62} = \overline{CSAS_{62} CSAC_{63}}$ | |
| $S_{62} = \overline{CSAS_{62}!CSAC_{63}}$ | |
| $HPN_i = \overline{HASH\ CSAS_i\ CSAC_{i+1}}$ | $i = 31, 32$ |
| $HTN_i = \overline{HASH\ CSAS_i + HASH\ CSAC_{i+1}}$ | $i = 31, 32$ |

STAGE 3:

| | |
|---|---|
| $HN_i = \overline{H_i}$ | |
| | $46 \leq i \leq 53, i = 58, 59$ |
| $P_i^{i+1} = \overline{PN_i(TN_i + PN_{i+1})}$ | $31 \leq i \leq 60$ |
| $T_i^{i+1} = \overline{TN_i + TN_{i+1}}$ | $31 \leq i \leq 60$ |
| $cB1_{61} = \overline{PN_{61}(TN_{61} + cN1_{61})}$ | |
| $cB1_{62} = \overline{cN1_{62}}$ | |
| $HP_i^{i+1} = \overline{HPN_i(HTN_i + PN_{i+1})}$ | $i = 31, 32$ |
| $HT_i^{i+1} = \overline{HTN_i + TN_{i+1}}$ | $i = 31, 32$ |
| $HHN_i = \overline{HASH\ H_i}$ | $i = 30, 31$ |

STAGE 4:

| | |
|---|---|
| $PN_i^{i+3} = \overline{P_i^{i+1} + T_i^{i+1} P_{i+2}^{i+3}}$ | $31 \leq i \leq 58$ |
| $TN_i^{i+3} = \overline{T_i^{i+1} T_{i+2}^{i+3}}$ | $31 \leq i \leq 58$ |
| $cN2_i = \overline{P_i^{i+1} + T_i^{i+1} cB1_{i+2}}$ | $i = 59, 60$ |
| $cN2_i = \overline{cB1_i}$ | $i = 61, 62$ |
| $S_i = H_i!cB1_{i+1}$ | $i = 60, 61$ |
| $HPN_i^{i+3} = \overline{HP_i^{i+1} + HT_i^{i+1} P_{i+2}^{i+3}}$ | $i = 31, 32$ |
| $HTN_i^{i+3} = \overline{HT_i^{i+1} T_{i+2}^{i+3}}$ | $i = 31, 32$ |
| $HHXHN_i = HHN_{i-16}!H_i$ | $i = 46, 47$ |

STAGE 5:

| | |
|---|---|
| $P_i^{i+7} = \overline{PN_i^{i+3}(TN_i^{i+3} + PN_{i+4}^{i+7})}$ | $31 \leq i \leq 54$ |
| $T_i^{i+7} = \overline{TN_i^{i+3} + TN_{i+4}^{i+7}}$ | $31 \leq i \leq 54$ |
| $cB2_i = \overline{PN_i^{i+3}(TN_i^{i+3} + cN2_{i+4})}$ | $55 \leq i \leq 58$ |
| $cB2_i = \overline{cN2_i}$ | $59 \leq i \leq 62$ |
| $S_i = HN_i!cN2_{i+1}$ | $i = 58, 59$ |
| $HP_i^{i+7} = \overline{HPN_i^{i+3}(HTN_i^{i+3} + PN_{i+4}^{i+7})}$ | $i = 31, 32$ |
| $HT_i^{i+7} = \overline{HTN_i^{i+3} + TN_{i+4}^{i+3}}$ | $i = 31, 32$ |

STAGE 6:

| | |
|---|---|
| $PN_i^{i+15} = \overline{P_i^{i+7} + T_i^{i+7} P_{i+8}^{i+15}}$ | $31 \leq i \leq 46$ |
| $TN_i^{i+15} = \overline{T_i^{i+7} T_{i+8}^{i+15}}$ | $31 \leq i \leq 46$ |
| $cN3_i = \overline{P_i^{i+7} + T_i^{i+7} cB2_{i+8}}$ | $47 \leq i \leq 54$ |
| $cN3_i = \overline{cB2_i}$ | $55 \leq i \leq 62$ |
| $S_i = H_i!cB2_{i+1}$ | $54 \leq i \leq 57$ |
| $HPN_i^{i+15} = \overline{HP_i^{i+7} + HT_i^{i+7} P_{i+8}^{i+15}}$ | $i = 31, 32$ |
| $HTN_i^{i+15} = \overline{HT_i^{i+7} T_{i+8}^{i+15}}$ | $i = 31, 32$ |

STAGE 7: $cB3_i = \overline{PN_i^{i+15}(TN_i^{i+15} + cN3_{i+16})}$    $31 \leq i \leq 46$ -continued $$cB3_i = \overline{cN3_i} \qquad 47 \leq i \leq 62$$

$$S_i = HN_i | cN3_{i+1} \qquad 46 \leq i \leq 53$$

$$HHXHXc_i = \overline{HHXHN_i | cN3_{i+1}} \qquad i = 46, 47$$

$$HcB3_i = HPN_i^{i+15} (HTN_i^{i+15} + cN3_{i+16}) \qquad i = 31, 32$$

STAGE 8:

$$EA_i = HcB3_{i-15} | HHXHXc_i \qquad i = 46, 47$$

wherein $CSAS_i$ represents the sum at bit position i, $CSAC_i$ represents a carry produced from bit position i into i−1 by the 3-2 carry save adder, (the bits being numbered in ascending order from the most significant bit zero to the least significant bit); $S_i$ represents a sum from the multiple stage adder means, $H_i$ represents the half sum at i for said 2-1 carry look ahead adder, $P_i$ represents a generate at bit i, $T_i$ represents a transmit at bit i, $c_i$ represents a carry from bit i into i−1 for said 2-1 carry look ahead adder, $EA_i$ represents an effective address at bit i, $HS_i$ represents a hashed output from said multiple stage adder means, $HP_i$ represents the generate ANDed with HASH, HASH is set to a logic one when hashing is desired, $HT_i$ represents the transmit ANDed with HASH, $HH_i$ represents the half sum ANDed with HASH, $HHXH_i$ represents HH, at i−15 EXCLUSIVE-ORed with the half sum at i, and $Hc_i$ represents the carry ANDed with HASH, and an N following a symbol represents the logical not of the signal, a B following a symbol represents buffering of the signal, ∀ represents an EXCLUSIVE-OR operation, + represents a logical OR operation, and adjacency represents a logical AND operation.

17. A cache system as set forth in claim 16 further comprising:

means for unhashing said one first address; and wherein the means for unhashing comprises means for implementing the following logical equations:

$$UEA_i = \text{HASH } (S_{i-16} \forall EA_i) + \text{HASHN } EA_i$$

where EAi represents said one first address and UEAi represents said unhashed one first address.

18. A cache system as set forth in claim 9 wherein said multiple stage adder means comprises:

a 3-2 adder coupled to receive and add said address components; and a 2-1 adder coupled to receive and add an output of said 3-2 adder; and wherein said hashing means performs said hashing operation on bits derived from an output of said 3-2 adder in parallel with operation of said 2-1 adder.

19. A cache system as set forth in claim 18 wherein said means for hashing hashes an output of said 3-2 adder in parallel with operation of said 2-1 adder.

20. A cache system as set forth in claim 18 wherein said 3-2 adder is a 3-2 carry save adder, and said 2-1 adder is a 2-1 carry lookahead adder.

21. A cache system as set forth in claim 18 wherein said means for hashing hashes sum and carry outputs of said 3-2 adder in parallel with operation of said 2-1 adder.

22. A cache system as set forth in claim 21 wherein said 2-1 adder adds sum and carry outputs of said 3-2 adder.

* * * * *